(No Model.) 6 Sheets—Sheet 1.
J. W. DARLEY, Jr.
WHEEL GUARD FOR STREET CARS.
No. 555,852. Patented Mar. 3, 1896.
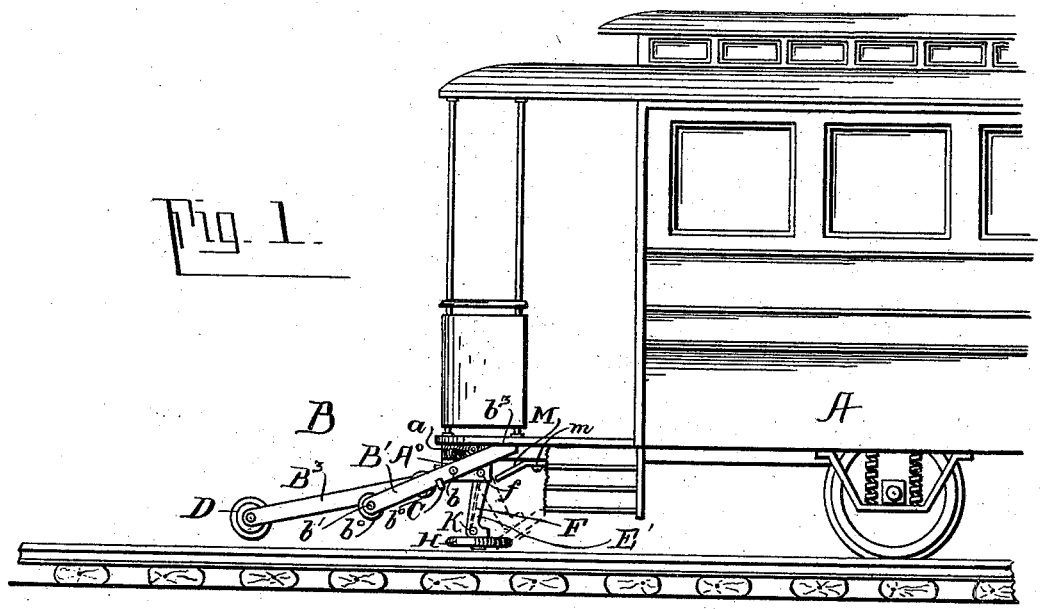
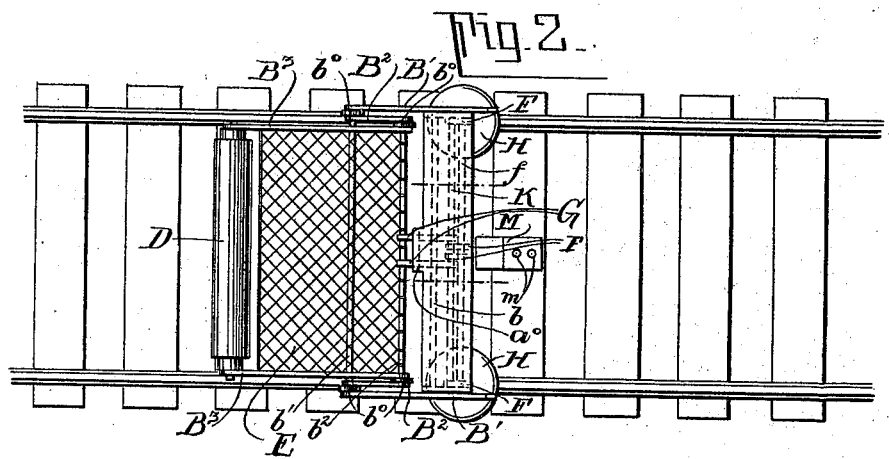
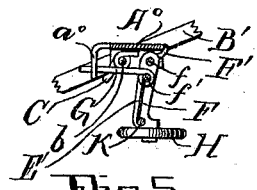
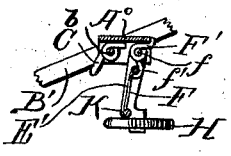
Witnesses
Inventor
John W. Darley, Jr.,
by Whitman & Wilkinson,
Attorneys.

(No Model.) 6 Sheets—Sheet 2.

J. W. DARLEY, Jr.
WHEEL GUARD FOR STREET CARS.

No. 555,852. Patented Mar. 3, 1896.

Witnesses
Inventor
John W. Darley, Jr.
by Whitman & Wilkinson,
Attorneys.

(No Model.) 6 Sheets—Sheet 3.
J. W. DARLEY, Jr.
WHEEL GUARD FOR STREET CARS.

No. 555,852. Patented Mar. 3, 1896.

Witnesses

Inventor
John W. Darley, Jr.
by Whitman & Wilkinson,
Attorneys.

(No Model.) 6 Sheets—Sheet 4.
J. W. DARLEY, Jr.
WHEEL GUARD FOR STREET CARS.
No. 555,852. Patented Mar. 3, 1896.
Fig. 10.
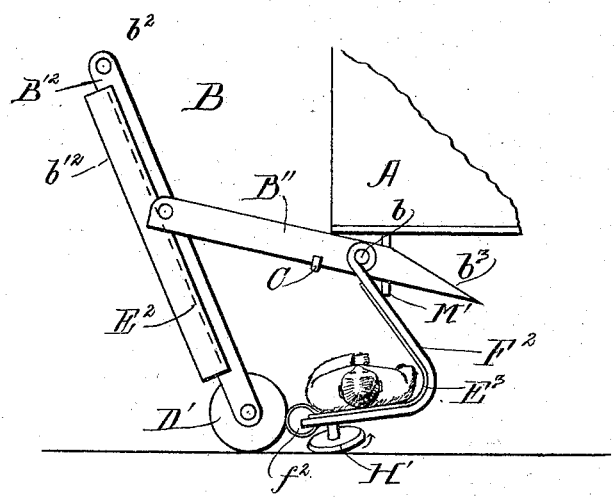
Fig. 11. Fig. 12.
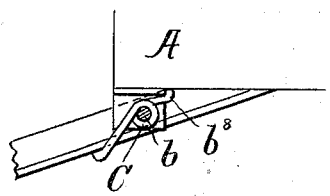 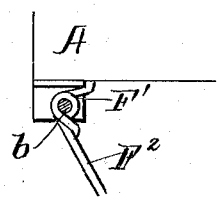
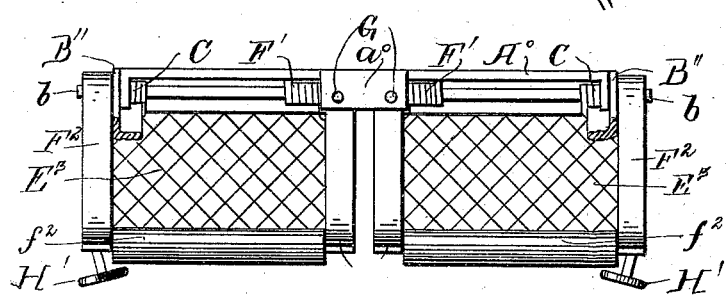
Fig. 13.
Witnesses
Inventor
John W. Darley, Jr.
by Whitman & Wilkinson
Attorneys (No Model.) 6 Sheets—Sheet 5.
J. W. DARLEY, Jr.
WHEEL GUARD FOR STREET CARS.
No. 555,852. Patented Mar. 3, 1896.
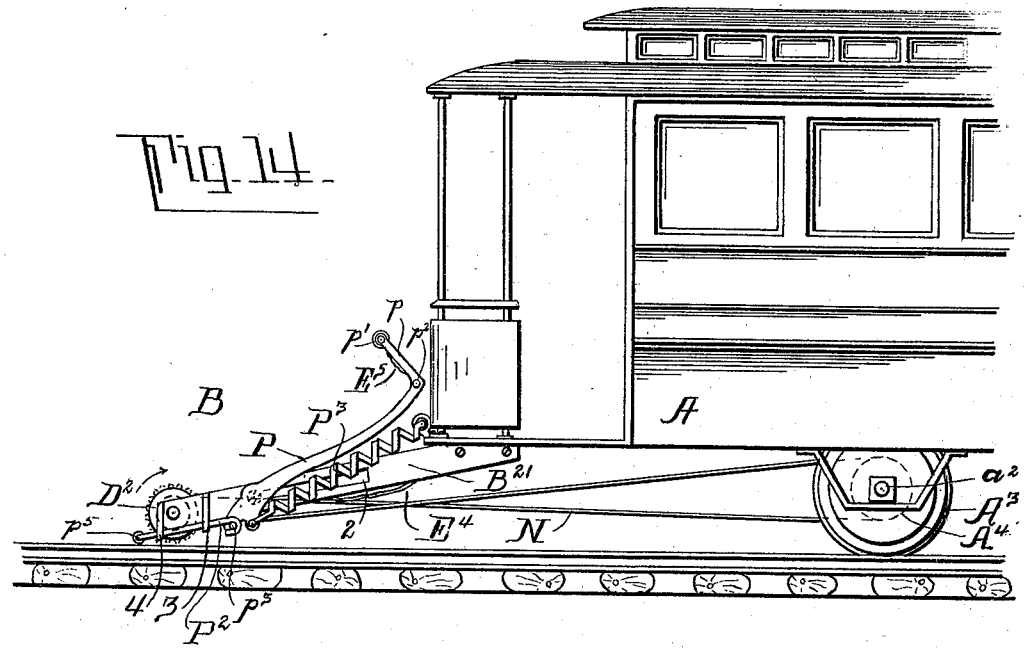
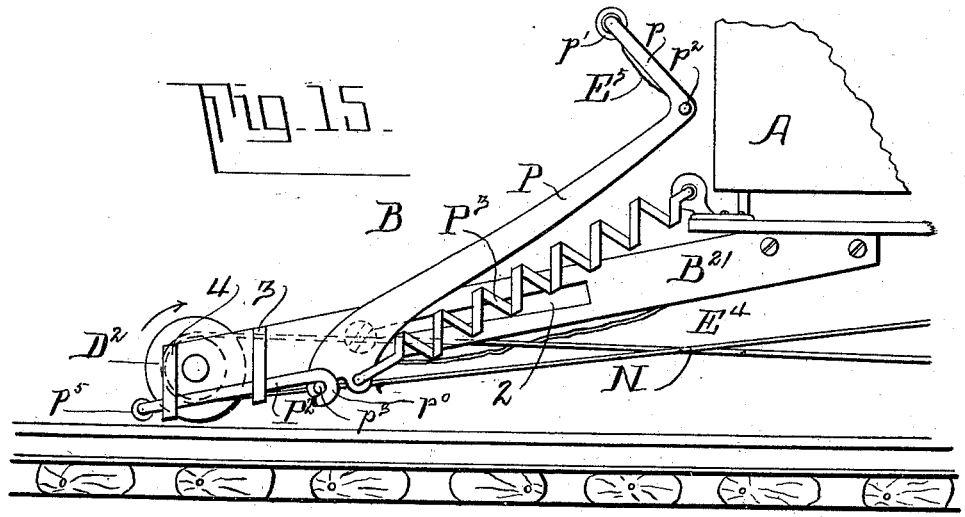
Witnesses
Inventor
John W. Darley, Jr.
by Whitman & Wilkinson
Attorneys (No Model.) 6 Sheets—Sheet 6.

J. W. DARLEY, Jr.
WHEEL GUARD FOR STREET CARS.

No. 555,852. Patented Mar. 3, 1896.

Witnesses
S. W. Ellis.
M. J. Sioussa.

Inventor
John W. Darley, Jr.,
by Whitman & Wilkinson
Attorney

UNITED STATES PATENT OFFICE.

JOHN W. DARLEY, JR., OF BALTIMORE, MARYLAND, ASSIGNOR OF ONE-HALF TO MICHAEL HOLZMAN, PHILIP HAMBURGER, AND LEON HAMBURGER, OF SAME PLACE.

WHEEL-GUARD FOR STREET-CARS.

SPECIFICATION forming part of Letters Patent No. 555,852, dated March 3, 1896.

Application filed May 7, 1894. Serial No. 510,368. (No model.)

*To all whom it may concern:*

Be it known that I, JOHN W. DARLEY, Jr., a citizen of the United States, residing at Baltimore, in the State of Maryland, have invented certain new and useful Improvements in Wheel-Guards for Street-Cars; and I do hereby declare the following to be a full, clear, and exact description of the invention, such as will enable others skilled in the art to which it appertains to make and use the same.

My invention relates to improvements in wheel-guards for street-cars; and it consists essentially of a device whereby a man or like object is prevented from being run over by the wheels of the car, being rolled up into a net or nets or pushed to one side of the track, as will be hereinafter described.

The several methods by which this result is accomplished will be understood by reference to the accompanying drawings, wherein like parts are indicated by similar letters and numerals throughout the several views.

Figure 3:
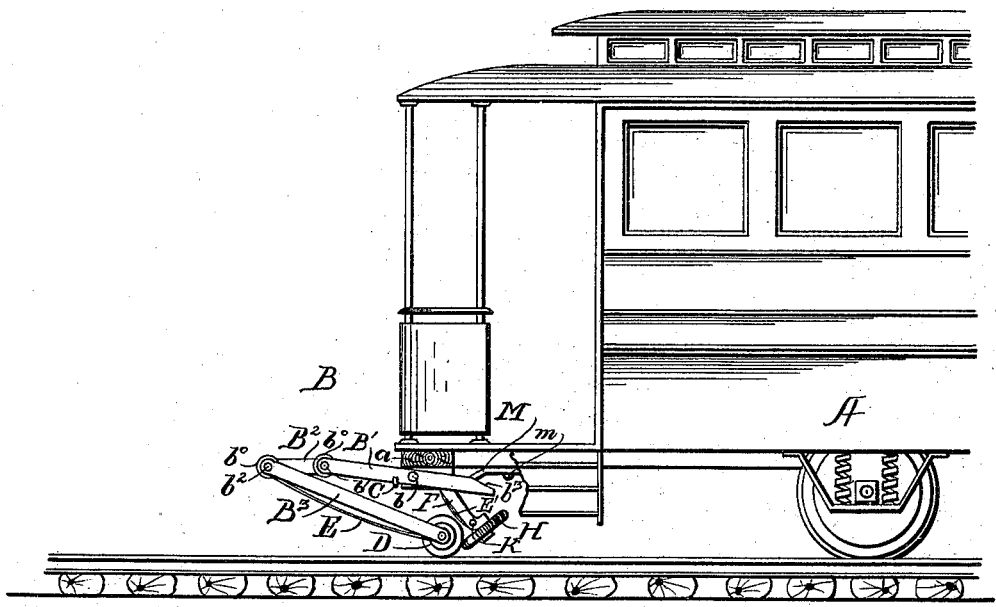
Figure 4:
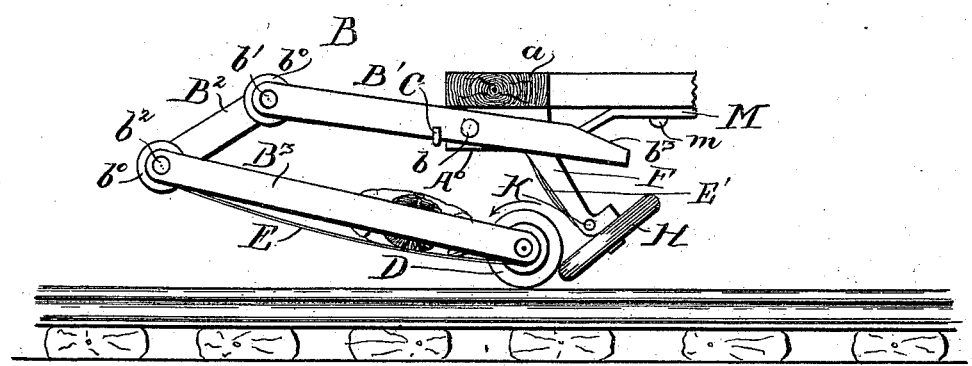
Figure 7:
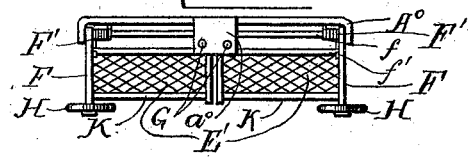
Figure 8:
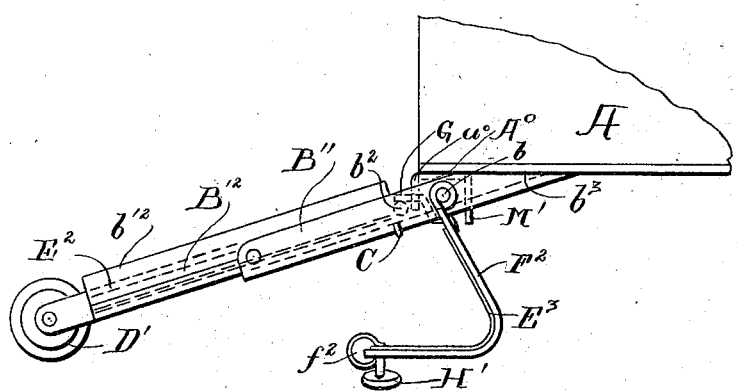
Figure 9:
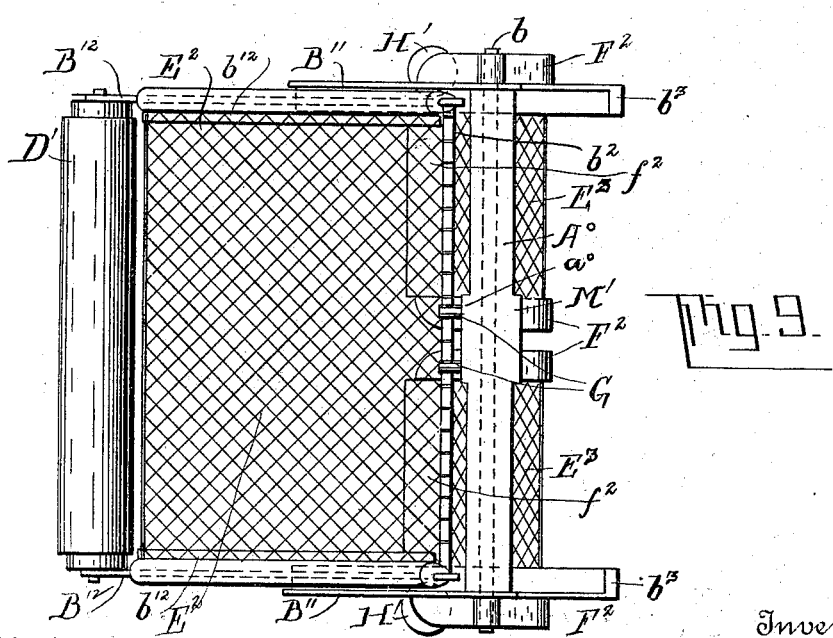
Figure 16:
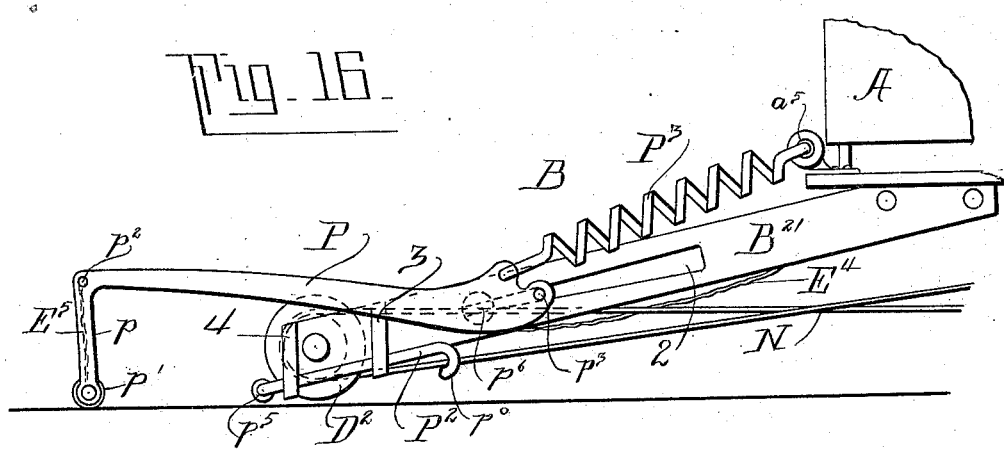
Figure 17:
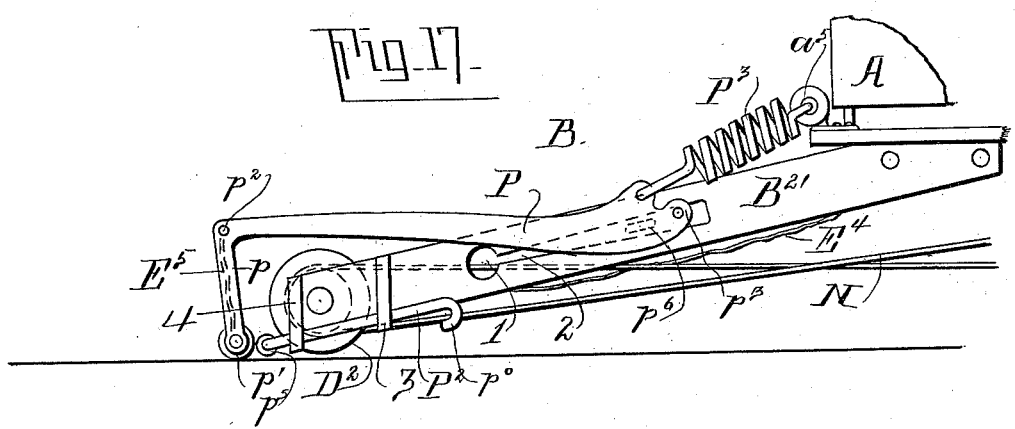
Figure 18:
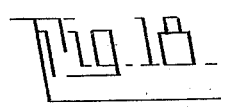

Figure 1 represents the front end of an electric car provided with one form of my improved life-saving apparatus. Fig. 2 represents a plan view of the life-saving apparatus as detached from the car, which latter is omitted for the sake of clearness in the drawings. Fig. 3 represents a side elevation of the device shown in Fig. 1 after it has been thrown by striking the man or other object into the position for holding him in the safety position. Fig. 4 is an enlarged view of the apparatus in the position indicated in Fig. 3 and showing the body of a man in the net. Figs. 5 and 6 represent detail views of the springs and attachments by which the various parts are released. Fig. 7 is a front view of the double frames suspended beneath the car. Fig. 8 represents a side elevation of another form of apparatus by means of which the man is rolled into a net provided beneath the car. Fig. 9 represents a plan view of the device shown in Fig. 8. Fig. 10 represents a side elevation of the devices shown in Figs. 8 and 9 after the man has been rolled into the net. Figs. 11 and 12 represent detail views of the springs and attachments for tripping the various connected parts. Fig. 13 is a front view of the double suspended frames shown in Figs. 8 to 10. Fig. 14 represents a side elevation of another form of device in which the man is rolled up onto a net fixed in front of the car and is held against being rolled along the track by means of a bent pivoted arm. Fig. 15 represents an enlarged view of the device shown in Fig. 14. Fig. 16 represents a side view of the device shown in Figs. 14 and 15 after the pivoted arm has been detached and swung down into the second position. Fig. 17 represents a similar view after the pivoted arm has resumed the third or final position, and Fig. 18 represents a detail view showing the inside of the pivoted arm with the guide lug or pivot of the same.

In many of the devices hitherto designed for this purpose the device was either so low as to be operated by small obstructions that frequently are found upon street-car lines or placed so high that the man was struck by the same and rolled along the track, finally finding his way beneath the car-wheels, with the usual result.

It was my purpose in making the present invention to provide a device which will safely receive the man should he be knocked down while standing or walking on the track, be rolled into a net if lying clear across the track, and be pushed aside, clear of the wheels, if lying to either side of the central line between the two tracks, and thus providing for all emergencies likely to occur under ordinary circumstances.

In the various figures, A represents the body of the car, and B represents a frame projecting from the front of the car, provided with a net into which the person will fall if tripped up by the roller carried on the forward end of said frame. The construction of this frame and the various parts connected thereto differs somewhat in the devices shown in the group of views, Figs. 1 to 7, inclusive, from that shown in the group of views, Figs. 8 to 13, inclusive, and more particularly that shown in Figs. 14 to 18, inclusive.

It will thus be seen that I provide three different forms of device for accomplishing the same result.

Taking up the devices in the order of figures and with special reference to Figs. 1 to 7, inclusive, the frame B is formed of three parts B', B² and B³, on each side of the car, which parts are pivoted together by transverse rods $b'$ and $b^2$, with washers $b^0$ interposed between the joints to lessen friction and insure prompt action. The part B' is pivoted, as at $b$, to a plate A⁰, which is secured beneath one of the cross-timbers $a$ at the front end of the car. This part B' is beveled, as at $b^3$, to rest against the bottom of the car, as shown in Fig. 1.

The part B' is pressed upon forward of its pivot center by a spring C, (shown in detail in Fig. 5,) which spring normally tends to press the forward end of said part B' upward or into the position shown in Figs. 3 and 4; but this tension of the spring is overcome by the weight of the parts B³, which rest on the transverse rod $b'$ and are pivoted at their rear ends on the transverse rod $b^2$, which rod $b^2$ engages beneath the two sliding pins G, and are held beneath the same except when said pins are pushed backward, as will be hereinafter described. At their forward ends these parts B³ carry a roller, which is preferably made of soft material covered with india-rubber, which latter should preferably be longitudinally corrugated in order to adhere the better to the body or clothing of the person who is to be rolled into the net E, which is secured across the part B³, as shown in Fig. 2.

A pair of nets E' are stretched from the downwardly-projecting arms F, which arms are pivoted on the rod $f$ beneath the car and carry near their lower ends rollers H, which may be horizontally disposed, as shown in Figs. 1, 5, and 6, or may be set at an angle, as shown in Figs. 8 to 10. These arms F carry cross-bars $f'$ and K to which the net E' is secured. Each of said arms F is connected to a frame which is suspended from the transverse rod $f$ and extends to the center of the car, these two frames each carrying its own net E', being independent of each other, and each being connected to one of the sliding pins G, as shown most clearly in Fig. 7.

Each of the arms F is normally pressed forward by the spring F', (shown in detail in Fig. 6,) which spring in forcing the arm F and frame connected thereto pushes the pin G forward and thus holds the rod $b^2$ from swinging upward, due to the weight of the roller D and the side pieces $b^3$.

It will be seen that when one of these arms K is pressed back, as shown in dotted lines in Fig. 1, only one of the pins G will be withdrawn and the other pin will still hold the rod $b^2$; but when both of the arms F are pressed back both of the pins will be withdrawn and the roller D will drop on the track, while the springs C will throw the parts B' upward, allowing the roller to pass to the rear, as shown in Figs. 3 and 4. The roller now moving in the direction of the arrow, due to friction on the ground, and the man being pressed by it against the net E will be caused to roll over said roller and to fall in the net E, as shown in Fig. 4.

The backward movement of the arms F and frames connected thereto is resisted by the spring F', which lessens the violence of the impact, and is finally limited by a suitable stop M, secured at $m$ beneath the bottom of the car.

From the foregoing it will be seen that if a man, woman or child, walking across the track, be struck by the roller D the person will either fall on the net E and be safely held there or being knocked down and lying on the track the roller D will pass completely over the person, who will strike one or both of the frames connected to the arms F. If the person strike one of said frames only one of the arms F would be pushed backward and only one of the pins G would be withdrawn. This would ordinarily happen when the person fell to one side of the median line of the tracks, and part of the body would project beyond the side of the track, or if slanting across the track. In this case the wheel H would push the part of the body on the track forward, and acting as a rolling fender would shove the entire mass off to one side of the track and clear of the wheels of the car. Where both frames are struck, both arms F would be forced back, both pins G would be released, and the person would be caught between the roller D and the nets E' and rolled forward into the net E, as has been described. When the person is lying diagonally across the track the first frame struck will release its pin and will push the person into a position more or less at right angles to the track, and then the second frame will release its pin and the roller D will drop into operative position. Thus it will be seen that the roller is never operated until the person is in the proper position to be rolled up into the net.

In the form of device shown in Figs. 8 to 13 the frame B is made of the two side plates B¹¹ and B¹², pivoted together, as shown most clearly in Fig. 10. The side pieces B¹¹ are pivoted, as at $b$, beneath the car and normally pressed upward by a spring C, as shown in detail in Fig. 11. The side pieces B¹² are connected together at their rear ends by a rod $b^2$ and have journaled in their forward ends a roller B'. Secured beneath these side pieces B¹² is a net E². The said side pieces are preferably padded, as shown at $b^{12}$, and the net is preferably secured to the said padding.

U-shaped arms F³ are suspended at either side of the car and form the outer sides of double U-shaped frames, one on either side of the car. These frames are preferably padded, as at $f^2$, and carry nets E³. Each of said frames is connected to one of the pins G which normally hold the rod $b^2$ down and lift the roller D' clear of the track.

It will be seen that the rod $b^2$ will not be disengaged from its position beneath the pins G unless both of the said pins be drawn backward.

The backward motion of the arms F² and frames connected thereto is limited by the stop M', but there is a tension of the spring F', which resists any tendency to push the arms F² and frames attached thereto backward. These arms F² carry rollers F', preferably set at an angle inclined downward and outward from the horizontal, so that when the arm F² is pressed back this roller will strike the edge of the track or the ground and be given a motion in the direction of the arrow, as shown at Fig. 10, thereby causing the said wheel to roll the person off the track should he fall to one side of the median line thereof.

From an inspection of the figures it will be seen that a person walking or standing on the track may be knocked down by the soft roller D' and fall into the net E without material injury; or if knocked down or lying on the track he will, if in the center of the track, trip both of the arms F² and the pins G connected thereto, allowing the roller D' to fall into the position shown in Fig. 10, which roller will press the man up onto the nets E³ carried by the U-shaped frames beneath the car, as shown in Fig. 10. If the man be down and lying on one side of the median line of the track, he will pass under the roller D' and, pressing back only one of the frames, will be rolled by the inclined wheel H' to one side of the track and clear of the wheels.

In all of the devices hereinbefore described it will be evident that no matter what be the position of the person so long as he is struck from forward by the car he will be protected against being run over by the wheels.

It will be evident that where cars are to be run both ways the herein-described devices might be placed at either or both ends of the car, or a single detachable device might be used with means for attaching the same to either end of the car.

In the form of device shown in Figs. 14 to 18 the frame B is rigidly attached to the car and carries a net E⁴ similar to those already described, and also a wheel D², which is clear of the ground, and is kept in revolution by means of a belt N, driven by a pulley A⁴, mounted on the axle $a^2$ of the wheels A³ of the car. This belt is crossed so that the roller D² may be caused to revolve in the direction of the arrow. Now any person or object falling in front of this roller would be rolled along in front of the car unless some provision were made to hold the said person close enough against the roller to cause the friction of the same to pick him up and deposit him in the net E⁴. For the purpose of increasing the friction the surface of the said roller should preferably be dentated or roughened and should be made of india-rubber or like material.

For the purpose of holding the man firmly against the roller, I provide a hooked arm P bent, as at $p$, and carrying at its outer end a roller $p'$, above which roller and secured to the rod $p^2$ spanning the two arms on either side of the car I secure a net E⁵. These hooked arms are pivoted about an oblong lug $p^6$, which engages transversely in the circular aperture 1 in fixed side bars B²¹, and thus prevents the arm from being drawn backward by the spring P³ when it is in the raised position shown in Figs. 12 and 13. When the arm is in the lowered position, however, (shown in Figs. 16 and 17,) the oblong lug slides freely into the narrow groove 2 and allows the said spring P³ to draw back the arm and to press the man between the net E⁵ and the revolving roller D².

The arms P are normally held in the raised position, as shown in Figs. 14 and 15, by means of the trip-bars P², which are provided with a roller $p^5$ at the forward end and a hook $p^0$ adapted to engage a stud $p^3$ on the pivoted arms P. When these rollers $p^5$ strike an object—for instance, a man on the track—the trip-bars P² are pressed back quickly, disengaging the hook $p^0$ from the stud $p^3$ and allowing the springs P³ to throw the arms P forward, and then draw them backward from the position shown in Fig. 16 to that shown in Fig. 17, and thus firmly press the man against the roller D² and cause him to be rolled up into the net E⁴. These trip-bars P² slide in suitable guides 3 and 4 on the side plates B²¹, and a spring or other holding device for preventing the same from tripping too readily may be added if desired.

Any other suitable means of tripping the bars P may be provided, as I do not wish to limit myself to the specific means herein described.

In all of the various constructions herein described suitable padding—such as excelsior, felt, canvas, rubber, &c.—should be employed on the parts intended to strike the person to be protected from injury; but as this is not a part of my invention such padding is not illustrated in most of the figures, in order that greater clearness in the drawings may be secured.

It will be obvious that many modifications of the herein-described apparatus could be made which could be used without departing from the spirit of my invention.

Having thus described my invention, what I claim, and desire to secure by Letters Patent of the United States, is—

1. In a fender for street-cars, the combination with a frame connected to the car, a net carried thereby, and a roller mounted in said frame, of means operated by the impact for holding an oblong object against said roller and so causing it to be rolled thereby into said net, substantially as described.

2. In a wheel-guard for street-cars, the combination with a frame protruding from the car, a net carried thereby, and a roller extending across the forward end of said frame, of a second net carried by the car, and means for causing one of said nets to approach the other and yet to cause said roller to be interposed between them, substantially as and for the purposes described.

3. In a wheel-guard for street-cars, a pivoted frame yieldingly suspended beneath the car, a net carried by said frame, a yielding arm at the outer end of said frame, and a wheel revolubly mounted at the lower end of said arm and adapted to roll oblong objects from the track, substantially as and for the purposes described.

4. In a wheel-guard for street-cars, a pivoted frame yieldingly suspended beneath the car, a net carried by said frame, a yielding arm at the outer end of said frame, and a wheel obliquely disposed to said arm and revolubly mounted at the lower end thereof and adapted to roll oblong objects from the track, substantially as and for the purposes described.

In testimony whereof I affix my signature in presence of two witnesses.

JOHN W. DARLEY, JR.

Witnesses:
J. C. WILSON,
PERCY C. BOWEN.